United States Patent [19]

Myers

[11] Patent Number: 5,688,465
[45] Date of Patent: Nov. 18, 1997

[54] METHOD OF CORONA TREATING A HYDROPHOBIC SHEET MATERIAL

[75] Inventor: David Lewis Myers, Cumming, Ga.

[73] Assignee: Kimberly-Clark Worldwide, Inc., Neenah, Wis.

[21] Appl. No.: 645,435

[22] Filed: May 13, 1996

[51] Int. Cl.⁶ ............................................. B29C 71/04
[52] U.S. Cl. ............................................. 264/423; 264/483
[58] Field of Search ............................ 264/423, 469, 264/483

[56] References Cited

U.S. PATENT DOCUMENTS

| | | |
|---|---|---|
| 3,016,599 | 1/1962 | Perry, Jr. . |
| 3,067,119 | 12/1962 | Ramaika . |
| 3,341,394 | 9/1967 | Kinney . |
| 3,369,981 | 2/1968 | Levaux . |
| 3,391,044 | 7/1968 | Kaghan et al. ............ 264/483 X |
| 3,655,862 | 4/1972 | Dorschner et al. . |
| 3,692,618 | 9/1972 | Dorschner et al. . |
| 3,704,198 | 11/1972 | Prentice . |
| 3,705,068 | 12/1972 | Dobo et al. . |
| 3,755,527 | 8/1973 | Keller et al. . |
| 3,779,882 | 12/1973 | Rosenthal . |
| 3,802,817 | 4/1974 | Matsuki et al. . |
| 3,849,241 | 11/1974 | Butin et al. . |
| 3,853,651 | 12/1974 | Porte . |
| 3,978,185 | 8/1976 | Butin et al. . |
| 4,064,605 | 12/1977 | Akiyama et al. . |
| 4,091,140 | 5/1978 | Harmon . |
| 4,100,319 | 7/1978 | Schwartz . |
| 4,100,324 | 7/1978 | Anderson et al. . |
| 4,118,531 | 10/1978 | Hauser . |
| 4,340,563 | 7/1982 | Appel et al. . |
| 4,375,718 | 3/1983 | Wadsworth et al. . |
| 4,405,297 | 9/1983 | Appel et al. . |
| 4,434,204 | 2/1984 | Hartman et al. . |
| 4,588,537 | 5/1986 | Klaase et al. . |
| 4,627,811 | 12/1986 | Greiser et al. . |
| 4,644,045 | 2/1987 | Fowells . |
| 4,663,220 | 5/1987 | Wisneski et al. . |
| 4,749,348 | 6/1988 | Klaase et al. . |

FOREIGN PATENT DOCUMENTS

| | | |
|---|---|---|
| 60 687 | 9/1982 | European Pat. Off. . |
| 2 337 022 | 12/1976 | France . |
| 1 460 636 | 4/1969 | Germany . |
| 2921121 | 12/1979 | Germany ................. 264/423 |
| 143082 | 7/1980 | Germany ................. 264/483 |
| 31 15 958 | 12/1982 | Germany . |
| 84/03193 | 8/1984 | WIPO . |

OTHER PUBLICATIONS

Search Report for PCT/US96/13227 dated Dec. 13, 1996.
Derwent abstract for JP 58–222118 (Published Dec. 23, 1983).
"Superfine Thermoplastic Fibers" by V. A. Wente, Industrial and Engineering Chemistry, vol. 48, No. 8, pp. 1432–1346 (1956).
"Manufacture of Superfine Organic Fibers", by V. A. Wente et al., Navy Research Laboratory, Washington, D.C., NRL Report 4364 (111437), May 25 1994, US Dept. of Commerce, Office of Technical Services.
"Melt Blowing—A One–Step Web Process for New Nonwoven Products" by R. R. Butin et al., Journal of the Technical Association of the Pulp and Paper Industry, vol. 56, No. 4, pp. 74–77 (1973).

*Primary Examiner*—Leo B. Tentoni
*Attorney, Agent, or Firm*—William E. Maycock

[57] ABSTRACT

A method of preventing localized arcing to ground during treatment of a sheet material in a corona discharge field generated by a corona discharge apparatus having at least two electrodes, which method involves passing the sheet material to be treated through the corona discharge field, in which the sheet material to be treated is electrically isolated from the electrodes. When the corona discharge apparatus has a bare metal electrode and a dielectric-covered electrode, the sheet material to be treated is passed through the corona discharge field as a layer of a multilayered composite having at least three layers, in which at least one of the layers is a nonconductive sheet material situated between the sheet material to be treated and the bare metal electrode. The method may be employed to treat a hydrophobic sheet material having a porosity, in which case the hydrophobic sheet material is passed through a corona discharge field generated by a corona discharge apparatus having a bare metal electrode and a dielectric covered electrode under conditions adapted to render the porous sheet wettable. The hydrophobic sheet material is a layer of a multilayered composite having at least three layers, in which at least one layer is a nonconductive sheet material situated between the sheet material to be treated and the bare metal electrode and one of the at least three layers is a nonconductive, nonporous sheet material.

19 Claims, No Drawings

METHOD OF CORONA TREATING A HYDROPHOBIC SHEET MATERIAL

BACKGROUND OF THE INVENTION

The present invention relates to a sheet material, such as a porous sheet material.

Polymers are used extensively to make a variety of products which include blown and cast films, extruded sheets, injection molded articles, foams, blow molded articles, extruded pipe, monofilaments, and fibrous materials such as nonwoven webs. Some of the polymers, such as polyolefins, have no functionality (i.e., reactive groups) and are naturally hydrophobic, and for many uses these properties are either a positive attribute or at least not a disadvantage.

There are a number of uses for polymers, however, where their hydrophobic/nonfunctional nature either limits their usefulness or requires some effort to modify the surface characteristics of the shaped articles made therefrom. By way of example, polyolefins, such as polyethylene and polypropylene, are used to manufacture polymeric fabrics which are employed in the construction of such disposable absorbent articles as diapers, feminine care products, incontinence products, training pants, wipes, and the like. Such polymeric fabrics often are nonwoven webs prepared by, for example, such processes as meltblowing, coforming, and spunbonding. Frequently, such polymeric fabrics need to be wettable by water. Wettability can be obtained by spraying or otherwise coating (i.e., surface treating or topically treating) the fabric with a surfactant solution during or after its formation, and then drying the web.

Some of the more common topically applied surfactants are nonionic surfactants, such as polyethoxylated octylphenols and condensation products of propylene oxide with propylene glycol, by way of illustration only. These surfactants are effective in rendering normally hydrophobic polymeric fabrics wettable. However, the surfactant is readily removed from the fabric, often after only a single exposure to an aqueous liquid.

Hydrophobic polymers also have been rendered wettable by passing the porous hydrophobic sheet material through a corona discharge field. A corona discharge field also has been used to improve ink adhesion on a surface of a film; to improve the adhesion of one film to another; or to introduce functional or ionic groups on the surfaces of the fibers of filter media, films, and the like. In some cases, a film has been rendered porous or more porous by exposing the film to a corona discharge field. Because arcing is an intrinsic phenomenon associated with a corona discharge field, localized arcing is a frequent and common occurrence. However, localized arcing results in the formation of pinholes in the material being treated. This result often is either desired or not a disadvantage. Localized arcing is a problem, though, when porous materials are utilized and it is desired that the porosity of the material not be altered by the corona discharge treatment.

Notwithstanding past improvements in rendering a polymeric fibrous material wettable or introducing functional or ionic groups on the surfaces of the fibers of filter media and films, there still are opportunities for improvements in these areas. This is particularly true where it is desired to treat a porous sheet material in a corona discharge field without altering the porosity of the sheet material.

SUMMARY OF THE INVENTION

The present invention addresses some of the difficulties and problems discussed above by providing a method of preventing localized arcing to ground during treatment of a sheet material in a corona discharge field generated by a corona discharge apparatus having at least two electrodes, which method involves passing the sheet material to be treated through the corona discharge field, in which the sheet material to be treated is electrically isolated from the electrodes.

When the corona discharge apparatus has a bare metal electrode and a dielectric-covered electrode, the sheet material to be treated is passed through the corona discharge field as a layer of a multilayered composite having at least three layers, in which at least one of the layers is a nonconductive sheet material situated between the sheet material to be treated and the bare metal electrode.

The method may be employed to treat a hydrophobic sheet material having a porosity, in which case the hydrophobic sheet material is passed through a corona discharge field generated by a corona discharge apparatus having a bare metal electrode and a dielectric covered electrode under conditions adapted to render the porous sheet wettable. The hydrophobic sheet material is a layer of a multilayered composite having at least three layers, in which at least one layer is a nonconductive sheet material situated between the sheet material to be treated and the bare metal electrode and one of the at least three layers is a nonconductive, nonporous sheet material. For example, the at least one layer which is a nonconductive sheet material situated between the sheet material to be treated and the bare metal electrode also may be nonporous.

In general, the sheet material may be any sheet material capable of being treated in a corona discharge field. The sheet material may be nonporous or porous. For example, the sheet material may be a film. As another example, the sheet material may be a fibrous web. The fibrous web may be woven or nonwoven. Examples of nonwoven fibrous webs include meltblown, coformed, and spunbonded nonwoven webs.

The sheet material may be made of any desired material which is capable of being treated in a corona discharge field. For example, the sheet material may be made from a synthetic polymer, such as a polyolefin. Particularly desired polyolefins include polypropylene and polyethylene.

DETAILED DESCRIPTION OF THE INVENTION

As used herein, the term "corona discharge field" is employed with its usual meaning. Such field may be generated by any means known to those having ordinary skill in the art.

The term "nonconductive" with reference to a sheet material is used herein to mean that the sheet material will not conduct electricity.

As used herein, the term "wettable" means wettable by water, e.g., the spontaneous absorption of water by a porous material such as a nonwoven web.

As stated earlier, the present invention provides a method of preventing localized arcing to ground during treatment of a sheet material in a corona discharge field generated by a corona discharge apparatus having at least two electrodes. The method involves passing the sheet material to be treated through the corona discharge field, in which the sheet material to be treated is electrically isolated from the electrodes.

The sheet material may be any sheet material capable of being treated in a corona discharge field. The sheet material may be nonporous or porous. For example, the sheet material may be a film. As another example, the sheet material may be a fibrous web. The fibrous web may be woven or nonwoven. Examples of nonwoven fibrous webs include, by way of illustration only, meltblown, coformed, spunbonded, air-laid, wet-laid, and bonded carded nonwoven webs.

A nonwoven web desirably will be formed by such well-known processes as meltblowing, coforming, spunbonding, and the like. By way of illustration only, such processes are exemplified by the following references, each of which is incorporated herein by reference:

(a) meltblowing references include, by way of example, U.S. Pat. Nos. 3,016,599 to R. W. Perry, Jr., 3,704,198 to J. S. Prentice, 3,755,527 to J. P. Keller et al., 3,849,241 to R. R. Butin et al., 3,978,185 to R. R. Butin et al., and 4,663,220 to T. J. Wisneski et al. See, also, V. A. Wente, "Superfine Thermoplastic Fibers", *Industrial and Engineering Chemistry*, Vol. 48, No. 8, pp. 1342–1346 (1956); V. A. Wente et al., "Manufacture of Superfine Organic Fibers", Navy Research Laboratory, Washington, D.C., NRL Report 4364 (111437), dated May 25, 1954, United States Department of Commerce, Office of Technical Services; and Robert R. Butin and Dwight T. Lohkamp, "Melt Blowing—A One-Step Web Process for New Nonwoven Products", *Journal of the Technical Association of the Pulp and Paper Industry*, Vol. 56, No.4, pp. 74–77 (1973);

(b) coforming references (i.e., references disclosing a meltblowing process in which fibers or particles are commingled with the meltblown fibers as they are formed) include U.S. Pat. Nos. 4,100,324 to R. A. Anderson et al. and 4,118,531 to E. R. Hauser; and (c) spunbonding references include, among others, U.S. Pat. Nos. 3,341,394 to Kinney, 3,655,862 to Dorschner et al., 3,692,618 to Dorschner et al., 3,705,068 to Dobo et al., 3,802,817 to Matsuki et al., 3,853,651 to Porte, 4,064,605 to Akiyama et al., 4,091,140 to Harmon, 4,100,319 to Schwartz, 4,340,563 to Appel and Morman, 4,405,297 to Appel and Morman, 4,434,204 to Hartman et al., 4,627,811 to Greiser and Wagner, and 4,644,045 to Fowells.

The sheet material may be made of any desired material which is capable of being treated in a corona discharge field. For example, the sheet material typically may be made from a synthetic polymer, which may be a thermosetting or thermoplastic polymer.

Examples of thermosetting polymers include, by way of illustration only, alkyd resins, such as phthalic anhydride-glycerol resins, maleic acid-glycerol resins, adipic acid-glycerol resins, and phthalic anhydride-pentaerythritol resins; allylic resins, in which such monomers as diallyl phthalate, diallyl isophthalate diallyl maleate, and diallyl chlorendate serve as nonvolatile cross-linking agents in polyester compounds; amino resins, such as aniline-formaldehyde resins, ethylene urea-formaldehyde resins, dicyandiamide-formaldehyde resins, melamine-formaldehyde resins, sulfonamide-formaldehyde resins, and urea-formaldehyde resins; epoxy resins, such as cross-linked epichlorohydrin-bisphenol A resins; phenolic resins, such as phenol-formaldehyde resins, including Novolacs and resols; and thermosetting polyesters, silicones, and urethanes.

Examples of thermoplastic polymers include, by way of illustration only, end-capped polyacetals, such as poly (oxymethylene) or polyformaldehyde, poly (trichloroacetaldehyde), poly(n-valeraldehyde), poly (acetaldehyde), poly(propionaldehyde), and the like; acrylic polymers, such as polyacrylamide, poly(acrylic acid), poly (methacrylic acid), poly(ethyl acrylate), poly(methyl methacrylate), polyacrylonitrile, and the like; fluorocarbon polymers, such as poly(tetrafluoroethylene), perfluorinated ethylene-propylene copolymers, ethylene-tetrafluoroethylene copolymers, poly (chlorotrifluoroethylene), ethylene-chlorotrifluoroethylene copolymers, poly(vinylidene fluoride), poly(vinyl fluoride), and the like; polyamides, such as poly(6-aminocaproic acid) or poly(ε-caprolactam), poly(hexamethylene adipamide), poly(hexamethylene sebacamide), poly(11-aminoundecanoic acid), and the like; polyaramides, such as poly(imino-1,3-phenyleneiminoisophthaloyl) or poly(m-phenylene isophthalamide), and the like; parylenes, such as poly-p-xylylene, poly(chloro-p-xylylene), and the like; polyaryl ethers, such as poly(oxy-2,6-dimethyl-1,4-phenylene) or poly(p-phenylene oxide), and the like; polyaryl sulfones, such as poly(oxy-1,4-phenylenesulfonyl-1,4-phenyleneoxy-1,4-phenylene-isopropylidene-1,4-phenylene), poly (sulfonyl-1,4-phenyleneoxy-1,4-phenylenesulfonyl-4,4'-biphenylene), and the like; polycarbonates, such as poly-(bisphenol A) or poly(carbonyldioxy-1,4-phenyleneisopropylidene-1,4-phenylene), and the like; polyesters, such as poly(ethylene terephthalate), poly (tetramethylene terephthalate), poly(cyclohexylene-1,4-dimethylene terephthalate) or poly(oxymethylene-1,4-cyclohexylenemethyleneoxyterephthaloyl), and the like; polyaryl sulfides, such as poly(p-phenylene sulfide) or poly (thio-1,4-phenylene), and the like; polyimides, such as poly (pyromellitimido-1,4-phenylene), and the like; polyolefins, such as polyethylene, polypropylene, poly(1-butene), poly (2-butene), poly(1-pentene), poly(2-pentene), poly(3-methyl-1-pentene), poly(4-methyl-1-pentene), and the like; vinyl polymers, such as poly(vinyl acetate), poly(vinylidene chloride), poly(vinyl chloride), and the like; diene polymers, such as 1,2-poly-1,3-butadiene, 1,4-poly-1,3-butadiene, polyisoprene, polychloroprene, and the like; polystyrenes; copolymers of the foregoing, such as acrylonitrile-butadiene-styrene (ABS) copolymers, and the like; and the like.

In some embodiments, the sheet material may be made of a synthetic hydrophobic polymer. Hydrophobic polymers in general give contact angles with water of at least about 60° and typically have surface free energies of less than about 45 dynes cm$^{-1}$ (mjoule m$^{-2}$). Examples of such polymers include, by way of illustration only, aromatic polyesters, polyolefins, polytetrafluoroethylene, poly(methyl methacrylate), poly(vinylidene fluoride), polyamides, and polystyrenes.

Aromatic polyesters include, by way of example only, poly(ethylene terephthalate), poly(tetramethylene terephthalate), poly(cyclohexane-1,4-dimethylene terephthalate), and thermotropic liquid crystalline such as the copolymers of hydroxybenzoic acid and hydroxynaphthoic acid.

Examples of polyolefins include, again by way of illustration only, polyethylene, polypropylene, poly(1-butene), poly(2-butene), poly(1-pentene), poly(2-pentene), poly(3-methyl-1-pentene), poly(4-methyl-1-pentene), and the like. In addition, such term is meant to include blends of two or more polyolefins and random and block copolymers prepared from two or more different unsaturated monomers. Because of their commercial importance, the most preferred polyolefins are polyethylene and polypropylene.

Polyamides include, by way of example only, poly(6-aminocaproic acid) (nylon 6), poly(hexamethylene sebacamide) (nylon 6,10), and poly(octamethylene suberamide) (nylon 8,8).

As already stated, the sheet material to be treated must be electrically isolated from the electrodes of the corona discharge apparatus. This may be accomplished by any means. For example, both electrodes may be covered with a dielectric sleeve. As another example, one electrode may be covered with a dielectric sleeve and one electrode may be covered with a nonconductive film which may be renewable. Other means will be readily apparent to those having ordinary skill in the art.

When the corona discharge apparatus has a bare metal electrode and a dielectric-covered electrode, the sheet material to be treated may be passed through the corona discharge field as a layer of a multilayered composite having at least three layers, in which at least one of the layers is a nonconductive sheet material situated between the sheet material to be treated and the bare metal electrode. If desired, the nonconductive sheet material situated between the sheet material to be treated and the bare metal electrode also may be nonporous.

The method may be employed to treat a hydrophobic sheet material having a porosity, in which case the hydrophobic sheet material is passed through a corona discharge field generated by a corona discharge apparatus having a bare metal electrode and a dielectric covered electrode under conditions adapted to render the porous sheet wettable. The hydrophobic sheet material is a layer of a multilayered composite having at least three layers, in which at least one layer is a nonconductive sheet material situated between the sheet material to be treated and the bare metal electrode and one of the at least three layers is a nonconductive, nonporous sheet material. For example, the at least one layer which is a nonconductive sheet material situated between the sheet material to be treated and the bare metal electrode also may be nonporous.

The present invention is further described by the examples which follow. Such examples, however, are not to be construed as limiting in any way either the spirit or the scope of the present invention.

Materials

In the examples, the following materials were used:

Polypropylene film: 2-mil (about 0.05-mm) thickness (Type XP715S/P, Lot #46805, Edison Plastics Co., Newport News, Va.).

Polyethylene Film: 1-mil (about 0.025-mm) thickness (standard linear low density polyethylene film).

Polytetrafluoroethylene film: 2-mil (about 0.05-mm) thickness (Fisher Scientific, Atlanta, Ga.).

Celgard® 2500 Microporous polypropylene film: Hoechst Celanese, Charlotte, N.C.

Manila Paperboard: 11-mil (about 0.3-mm) thickness (No. 2-152C, Smead Inc., Hastings, Minn.). The paperboard is believed to be porous, although no tests were run to verify or define such porosity.

Aluminum Foil: 1-mil (about 0.025-mm) thickness (Reynolds Metals Company, Richmond, Va.).

Corona Discharge Treater

A corona discharge field was generated by means of a Corotec Laboratory Corona Treating Station (Corotec Corporation, Collinsville, Conn.) equipped with a CXC-5 power supply. The Corotec Laboratory Corona Treating Station generated a high voltage alternating current corona discharge. The voltage of the discharge (peak to peak) ranged from 7 kV to 10 kV and the frequency ranged from 19 kHz to 20 kHz. The treater utilized two horizontally positioned, counter-rotating aluminum rolls as the electrodes. The bottom roll was grounded and its surface was covered by a 2-mm thick dielectric sleeve. The top roll was bare aluminum metal. The nip point formed by the two rolls provided a minimum gap of 2 mm. The actual gap between the electrodes during the treatment of a material was the sum of the thicknesses of the materials being passed through the gap and the 2-mm thick dielectric cover on the lower electrode. The line speed was fixed at 12 ft/min (about 6 cm/sec). The power dissipated in the gap during corona discharge was indicated by an integral power meter.

The corona energy density was a quantitative measure of power dissipated across the width of the electrodes per unit area of material being treated. This is simply expressed by dividing the output power of the power supply by the width of the anode (ft) and the line speed (ft/s). Energy density was assumed to be a cumulative function of the number of passes through the discharge. Typically, materials were passed through the discharge from 1 to 10 times. Table 1 lists energy density per pass for typical output power used in the examples.

TABLE 1

| Corona Energy Densities | |
|---|---|
| Output Power[a] | Energy Density[b] |
| 100 | 500 (5.38) |
| 200 | 1000 (10.8) |
| 300 | 1500 (16.2) |
| 400 | 2000 (21.5) |
| 500 | 2500 (26.9) |

[a] In watts or joule sec$^{-1}$.
[b] In watt sec ft$^{-2}$ (kjoule m$^{-2}$).

Critical Surface Tension of Wetting

A critical surface tension of wetting was determined for each sample treated using a Wetting Tension Test Kit, Model STT 11-1 (Pillar Technologies, Inc., Hartland, Wis. Mich.?). The critical surface tension of wetting was taken as the surface tension of the Pillar test kit fluid which was spontaneously absorbed into a porous substrates. The Wetting Tension Kit conforms to ASTM Standard D2578-67.

Surface Analysis

The surfaces of treated samples were analyzed by electron spectroscopy for chemical analysis (ESCA). All analyses were carried out with a Surface Science Instruments M-Probe ESCA Spectrometer. Spectral collections were performed with monochromatic aluminum x-ray excitation of an 800 square micrometer area of each sample. Differential charging of samples was compensated for by using a low energy (1 eV) flux of electrons from an electron flood gun.

EXAMPLE 1

Corona Discharge Treatment of Polypropylene Meltblown Nonwoven Webs

Samples of 0.5 ounce per square yard or osy (about 17 grams per square meter or gsm) polypropylene meltblown nonwoven webs were corona discharge treated at corona energy densities per pass ranging from 500 to 2500 watt sec ft$^{-2}$ (about 5.38 to 26.9 kjoule m$^{-2}$). Each meltblown sample was mounted as a multilayered structure in which 1 to 5 layers of material were overlayed or stacked to form a composite sample for corona treatment. No adhesive was applied between layers of the laminates; thus, after corona discharge treatment, the layers were easily separable.

The multilayered composites are referred to or described layer by layer, beginning with the layer closest to the top or bare metal electrode of the Treating Station and ending with the layer closest to the bottom electrode of the treater, i.e., the electrode covered with the dielectric sleeve. While in the examples a maximum of five layers were used, this number of layers should not be construed as limiting in any way either the spirit or the scope of the invention.

The multilayered composite were corona discharge treated by feeding the materials through the nip formed between the upper and lower electrodes of the Treating Station. The severity of treatment was varied by increasing the corona output power and by increasing the number of passes through the discharge field at a fixed corona energy density.

The numerous composite configurations examined are summarized in Table 2. Included in Table 2 are data indicating the observance of pinholes in the corona treated material and the critical surface tension for wetting (CSTW) of the treated meltblown nonwoven web for each configuration examined. The CSTW was evaluated on both the top and bottom sides of each fabric. In no case was the CSTW of the top side (the side closest to the bare metal electrode of the Treating Station) found to be different from that observed on the bottom side (the side closest to the dielectric-covered electrode of the Treating Station). All samples were passed through the corona discharge field a total of ten times at a fixed corona energy density of 1500 watt sec ft$^{-2}$ (about 16.2 kjoule m$^{-2}$). The following abbreviations are employed in all tables:

PPF=Polypropylene film
MB=Polypropylene meltblown nonwoven web
MPB=Manila paperboard

TABLE 2

Summary of Results for Corona Treatment of Nonwoven Webs in Multilayered Composites

| Composite Description | Pinholes | CSTW[a] | Wettable |
|---|---|---|---|
| MB | Yes | 58 | No |
| MB/PPF | Yes | 72 | Yes |
| PPF/MB | Yes | 72 | Yes |
| MB/PPF/PPF | Yes | 72 | Yes |
| PPF/MB/PPF | No | 72 | Yes |
| PPF/PPF/MB | Yes[b] | 72 | Yes |
| MB/MPB | Yes[c] | 58 | No |
| MPB/MB | Yes[c] | 72 | Yes |
| MB/MPB/MPB | Yes | 60 | No |
| MPB/MB/MPB | No | 58 | No |
| MPB/MPB/MB | No | 62 | No |
| MB/PPF/MPB | Yes[b] | 72 | Yes |
| MPB/PPF/MB | No | 72 | Yes |
| MB/MPB/PPF | Yes | 72 | Yes |
| PPF/MPB/MB | No | 72 | Yes |
| PPF/MB/MPB | No | 72 | Yes |
| MPB/MB/PPF | No | 72 | Yes |
| PPF/MB/PPF/MPB | No | 60 | No |
| MPB/PPF/MB/PPF | No | 60 | No |

[a]Critical surface tension of wetting in dynes cm$^{-1}$ (mjoule m$^{-2}$).
[b]Very few.
[c]Very large.

From the series of experiments summarized in Table 2, several conclusion can be drawn:
(a) isolation of the meltblown nonwoven web from the upper bare electrode was essential to prevent pinholes from forming in the web;
(b) hole sizes appeared to be controlled by the material which acts as a carrier sheet for the nonwoven web;
(c) the total composite thickness had a pronounced effect on the wettability of the treated nonwoven web; and
(d) the optimal sample configuration which yields a pinhole-free and water-wettable material was MPB/MB/PPF, i.e., manila paperboard/meltblown nonwoven web/polypropylene film.

Treatment Sidedness

The results of ESCA determinations on the surfaces of meltblown nonwoven web samples corona treated in the PPF/MB/MPB and MPB/MB/PPF configurations are summarized in Table 3. Each sample was corona treated at a corona energy density of 1500 Watt sec ft$^{-2}$ (about 16.2 kjoule m$^{-2}$) per pass for 10 passes.

TABLE 3

ESCA Analyses of Corona Treated Meltblown Nonwoven Webs

| | Element Atomic Percent | |
|---|---|---|
| Sample | Carbon | Oxygen |
| Control[a] | 100 | — |
| PPF/MB/MPB (top) | 88.5 | 11.5 |
| PPF/MB/MPB (bottom) | 89.5 | 10.5 |
| MPB/MB/PPF (top) | 88.7 | 11.3 |
| MPB/MB/PPF (bottom) | 90.3 | 9.7 |

[a]Noncorona treated MB.

The surface analysis data summarized in Table 3 illustrate quantitatively the lack of sidedness to the nonwoven web following corona treatment in the multilayered composite configuration.

Effect of Corona Power

The effect of output power of the corona treater on the CSTW and the surface composition of the meltblown nonwoven web was evaluated using the MPB/MB/PPF configuration described above. The surface composition was determined by ESCA analysis of the nonwoven web after treatment and is herein expressed as the ratio of the atomic percent of oxygen to that of carbon (O/C ratio). In all cases the samples were passed through the corona discharge field a total of five times. The results are summarized in Table 4.

TABLE 4

Summary of the Effect of Output Power

| Corona Power[a] | O/C Ratio[b] | CSTW[c] | Wettable |
|---|---|---|---|
| 100 | 9.0 | 56 | No |
| 200 | 11.5 | 56 | No |
| 300 | 12.6 | 60 | No |
| 400 | 17.6 | 62 | No |
| 500 | 14.5 | 62 | No |

[a]In watts or joule sec$^{-1}$.
[b]The calculated O/C ratio times 100.
[c]Critical surface tension of wetting in dynes cm$^{-1}$ (mjoule m$^{-2}$).

As can be seen from the table, both the surface O/C ratio and the CSTW increased with increasing corona power. Except for the O/C ratio at 400 watts or joule sec$^{-1}$, the increases in both the O/C ratio and CSTW appear to be roughly linear at output power rating increases above 100 watts or joule sec$^{-1}$.

Effect of Corona Treatment Severity

The effect of corona treatment severity (time) was evaluated by increasing the number of passes through a corona discharge field at fixed power. In this case the corona power was set at 300 watts or joule sec$^{-1}$, corresponding to a corona energy density of 1500 watt sec ft$^{-2}$ (about 16.2 kjoule m$^{-2}$) per pass. The results are summarized in Table 5.

TABLE 5

Summary of the Effect of Number of Passes

| Number Passes | O/C Ratio[a] | CSTW[b] | Wettable |
| --- | --- | --- | --- |
| 1 | 6.5 | 56 | No |
| 3 | 12.8 | 56 | No |
| 5 | 16.8 | 60 | No |
| 8 | 17.1 | 64 | No |
| 10 | 15.9 | 72 | Yes |

[a]The calculated O/C ratio times 100.
[b]Critical surface tension of wetting in dynes cm$^{-1}$ (mjoule m$^{-2}$).

According to the data in the table, the CSTW increased with the number of passes through the corona field, although fewer than about five passes had little apparent effect on the CSTW value. The surface O/C ratio, however, appeared to reach a maximum after about 5 passes.

EXAMPLE 2

Conductive versus Dielectric Film Layers in the Multilayered Composite

The corona treatment of the polypropylene meltblown nonwoven web was examined as a function of the electrical conductivity of the film layer used in the preparation of the multilayered composite. A 1-mil (about 0.025-mm) thick aluminum foil was used as a conductive film and several polymer films were evaluated as dielectric film layers. The corona treatment conditions were 1500 watt sec ft$^{-2}$ (about 16.2 (kjoule m$^{-2}$) per pass and 10 passes.

Conductive Film

Three samples of the meltblown nonwoven web were treated in multilayered composites which included an aluminum foil conductive film layer. In the first, a section of the meltblown web was mounted on manila paperboard with polypropylene film covering one half and aluminum foil the other. The sample was constructed such that, as the sample passed through the corona field, half of the electrode pair would "see" the polypropylene film and the other half would "see" the aluminum foil. Thus, the juncture between the two types of film was parallel to the direction of motion of the composite through the corona discharge apparatus.

After treatment, both sides of the meltblown nonwoven web had a CSTW value of 60 dynes cm$^{-1}$ (mjoule m$^{-2}$), while only the aluminum foil side had pinholes. A second experiment in which the same sample configuration was used except that the sample was constructed such that the aluminum foil and polypropylene film halves were treated sequentially. The results were the same. A third sample was prepared wherein a second polypropylene film layer was added between the manila paperboard and the nonwoven web. In this case, no pin holes were observed in either the aluminum foil covered or polypropylene film covered sides, and the CSTW value was the same on each side.

Nonconductive Film

Other examples of nonconductive films used as layers in multilayered composites included polytetrafluoroethylene (PTFE), polyethylene (PE), and Celgard® 2500 microporous polypropylene. The sample configuration was MPB/MB/Nonconductive Film.

No pinholes were observed in nonwoven webs treated using composites constructed with the PTFE or the PE film. Both samples had CTSW values of 72 dynes cm$^{-1}$ (mjoule m$^{-2}$). Corona treatment of the sample utilizing the Celgard® 2500 microporous polypropylene yielded a nonwoven web which was badly pinholed. In addition, the treatment uniformity was poor. Some areas had a CSTW value of 72 dynes cm$^{-1}$ (mjoule m$^{-2}$), while others had a CSTW value of 60 dynes cm$^{-1}$ (mjoule m$^{-2}$). This illustrates the need for a nonporous nonconductive film layer in the multilayered composite subjected to the corona discharge field in order to prevent the formation of pinholes in the nonwoven web while producing a web which is wettable.

EXAMPLE 3

Corona Discharge Treatment of Microporous Film

The corona discharge treatment of microporous films was demonstrated using sample of Celgard® 2500 microporous polypropylene film. The microporous film was treated in a manner similar to that described in Example 1. The corona treatment conditions were 1500 watt sec ft$^{-2}$ per pass and 10 passes. The Celgard film was treated either by itself or as a multilayered composite with PP film, PE film, and PTFE film.

Treatment of the Celgard® 2500 microporous polypropylene film by itself produced a material with pinholes over greater than 90 percent of its surface. The introduction of a nonconductive film such as PP film on top of the Celgard film prevented pinhole formation and yielded a material with a CSTW value of 72 dynes cm$^{-1}$ (mjoule m$^{-2}$). Identical results were obtained when treating with either the PTFE or PE films as covers.

EXAMPLE 4

Corona Discharge Treatment of Nonwoven Webs

The broad applicability of the multilayered composite approach to controlling pinhole formation during corona treatment of nonwoven webs was further demonstrated by examining higher basis weight polypropylene meltblown webs and a series of nonwoven webs made from polyethylene. The corona treatment conditions were 1500 watt sec ft$^{-2}$ per pass and 10 passes. The MPB/Nonwoven Web/PPF sample configuration was used for each nonwoven web. The nonwoven webs studied were as follows:

A—1.0 osy (about 34 gsm) polypropylene meltblown nonwoven web.

B—1.0 osy (about 34 gsm) polypropylene spunbonded nonwoven web.

C—1.6 osy (about 54 gsm) polyethylene meltblown nonwoven web.

D—6 osy (about 204 gsm) polyethylene meltblown nonwoven web.

The results of these studies are summarized in Table 6.

TABLE 6

Corona Treatment of Various Nonwoven Webs

| Sample | Pinholes | CSTW[a] | Wettable |
| --- | --- | --- | --- |
| A | No | 62 | No |
| B | No | 58 | No |
| C | No | 72 | Yes |
| D | No | 58 | No |

[a]Critical surface tension of wetting in dynes cm$^{-1}$ (mjoule m$^{-2}$).

While the specification has been described in detail with respect to specific embodiments thereof, it will be appreciated that those skilled in the art, upon attaining an understanding of the foregoing, may readily conceive of alterations to, variations of, and equivalents to these embodiments.

What is claimed is:

1. A method of preventing localized arcing to ground during treatment of a sheet material in a corona discharge field generated by a corona discharge apparatus having a bare metal electrode and a dielectric-covered electrode, which method comprises:

passing the sheet material to be treated through the corona discharge field as a layer of a multilayered composite having at least three layers, in which at least one of the layers is a nonconductive sheet material situated between the sheet material to be treated and the bare metal electrode.

2. The method of claim 1, in which the sheet material is a film.

3. The method of claim 1, in which the sheet material is porous.

4. The method of claim 3, in which the sheet material is a fibrous web.

5. The method of claim 4, in which the fibrous web is a nonwoven web.

6. The method of claim 5, in which the nonwoven web is a meltblown nonwoven web.

7. The method of claim 5, in which the nonwoven web is a spunbonded nonwoven web.

8. The method of claim 5, in which the nonwoven web is a polyolefin nonwoven web.

9. The method of claim 8, in which the polyolefin is polypropylene or polyethylene.

10. A method of treating a hydrophobic sheet material having a porosity which comprises:

passing the porous hydrophobic sheet material:
through a corona discharge field generated by a corona discharge apparatus having a bare metal electrode and a dielectric covered electrode;
under conditions adapted to render the porous sheet wettable; and
as a layer of a multilayered composite having at least three layers, in which at least one layer is a nonconductive sheet material situated between the sheet material to be treated and the bare metal electrode and one of the at least three layers is a nonconductive, nonporous sheet material;

thereby preventing the porosity of the hydrophobic sheet material from being altered.

11. The method of claim 10, in which the sheet material is a film.

12. The method of claim 10, in which the sheet material is porous.

13. The method of claim 12, in which the sheet material is a fibrous web.

14. The method of claim 13, in which the fibrous web is a nonwoven web.

15. The method of claim 14, in which the nonwoven web is a meltblown nonwoven web.

16. The method of claim 14, in which the nonwoven web is a spunbonded nonwoven web.

17. The method of claim 14, in which the nonwoven web is a polyolefin nonwoven web.

18. The method of claim 17, in which the polyolefin is polypropylene or polyethylene.

19. The method of claim 10, in which the at least one layer which is a nonconductive sheet material situated between the sheet material to be treated and the bare metal electrode also is nonporous.

* * * * *